United States Patent [19]
Huang

[11] Patent Number: 5,831,820
[45] Date of Patent: Nov. 3, 1998

[54] PERIPHERAL DOCKING MODULE USING A SHAPE MEMORY ALLOY ACTUATOR WIRE

[76] Inventor: James Huang, 11105 Knott Ave., Suite B, Cypress, Calif. 90630

[21] Appl. No.: 777,041

[22] Filed: Dec. 30, 1996

[51] Int. Cl.$^6$ .................................. G06F 1/16; H05K 7/12
[52] U.S. Cl. .......................... 361/686; 361/684; 361/754; 439/152
[58] Field of Search ...................... 371/683, 684, 371/685, 686, 752, 754, 798; 439/152, 928, 928.1, 932, 153; 364/708.1; G06F 1/16

[56] References Cited

U.S. PATENT DOCUMENTS

| | | | |
|---|---|---|---|
| 3,959,691 | 5/1976 | Clarke | 361/24 |
| 4,007,404 | 2/1977 | Jost et al. | 361/211 |
| 5,282,813 | 2/1994 | Redha | 606/159 |

*Primary Examiner*—Lynn D. Feild
*Attorney, Agent, or Firm*—Charles C. H. Wu

[57] ABSTRACT

A peripheral docketing module using a shape memory alloy actuator wire includes a shape memory alloy actuator wire controllably connected to an energy source; and a pivoting device mounted inside a system frame member architecturally positioned for occupying inside the system frame member together with a device docketed within the system frame member. Upon application of energy to the shape memory alloy actuator wire, the shape memory alloy actuator wire contracts and exerts a pulling force on the pivoting device. The result is that the pivoting device pushes and ejects the docketed device seated inside the system frame member. The employment of a shape memory alloy actuator wire replaces the employments of a solenoid and electrical motor and allows for a more compact design of an electronic system.

20 Claims, 2 Drawing Sheets

PERIPHERAL DOCKING MODULE USING A SHAPE MEMORY ALLOY ACTUATOR WIRE

BACKGROUND OF THE INVENTION

The present invention relates to a mechanism for ejecting a docketed device such as a computer storage device, computer peripheral, audio storage device and video storage device, within a system module.

Ejection mechanisms are known in the prior art to be implemented by a solenoid or an electrical motor. These prior arts have disadvantages, including one or more of the following:

1. There is an additional cost to manufacturing in that they require a solenoid device or an electrical motor to be added to the assembly;

2. They require a separated control mechanism to control the solenoid or the motor; and 3. They take up valuable space in a typical compact design.

It is also known to use the shape memory alloy actuator wire in robotic limbs, prosthetic limbs, micro pumps, blood pressure test valves, camera manipulators, and appliances.

The electronic industry is always moving toward a more compact design and miniaturization of electronic systems every year. The current state of the art advanced semiconductor design can pack an astronomical amount of transistors into a single silicon chip. Similarly, many layers of circuitry can now be designed into a circuit board. However, the outside housing of these silicon chips and circuit boards have not been similarly designed for miniaturization. For example, many circuit board manufacturers are still using the same transformer design that has been used in the last 25 years. The same analogy applies to other supporting mechanical devices such as solenoids and electrical motors. The laws of basic physics do not permit solenoids and electrical motors be designed any smaller than they currently are.

As the result, other means for saving valuable real estate in an electronic system can be employed.

One way of saving valuable real estate is to substitute out solenoids and electrical motors with other means that will perform the same function and that is the object of the present invention. Additionally, the present invention will accomplish physical movement in a small space with low to moderate cycling speeds.

The present invention replaces the bulky solenoids, electrical motors and other similar mechanical means for actuating or moving mechanical parts within an electronic system. Therefore, there is a need for a peripheral docking module using a shape memory alloy actuator wire.

SUMMARY OF INVENTION

The present invention is intended to actuate mechanical components of an electronic system with a design that uses minimal space and minimal energy. The present invention is intended to replace the bulky and expensive solenoids and electrical motors.

For ease of presentation, this section describes a device where the employment of a shape memory alloy actuator wire is on a horizontal plane. Other orientations are possible and this description is not intended to limit the scope of the invention to any particular geometry of the elements.

The present invention meets requirement of compact mechanical actuator design by employing a shape memory alloy actuator wire. The shape memory alloy actuator wire contracts upon application of electrical current at both ends of the wire. One end of the shape memory alloy actuator wire is anchored to a frame member of the system module. A strain relief device such as a spring or a shock absorber can be inserted between the shape memory alloy actuator wire and the frame member for the purpose minimizing sudden jerky movement of the shape memory alloy actuator wire and for an overall smooth operation of the system. Furthermore, the strain relief acts to prevent permanent deformation or elongation of the shape memory alloy actuator by reducing high stresses and strain to said wire.

The other end of the shape memory alloy actuator wire is attached to a pivoting device. The pivoting device is mounted inside the system frame member strategically positioned as a planned distance from the edge of the frame member.

The pivoting device can pivotally eject an inserted docketed device seated within a system frame member that is butted up against the pivoting device. For ease of operation and assembly, a connector can be employed for connecting the wire to the pivoting device.

Examples of the inserted docketed objects are: computer storage medias such as backup storage tapes, floppy disks, optical discs, compact discs; peripherals such as PCMCIA cards, and computer modems. Other devices are possible and this listing is not intended to be exhaustively inclusive.

A power source having two or more terminals provides the stimulus and energy to activate the contraction effect of the shape memory alloy actuator wire. Upon applying electrical current to both ends of the shape memory alloy actuator wire, the shape memory alloy actuator wire contracts, pulls and thereby causes the pivoting device to pivot about its axis. The pivoting effect of the pivoting device pushes and causes the inserted docketed device to be ejected out of the system frame member.

The shape memory alloy actuator wire can be insulated with an insulator to protect its surface from corrosion and also to prevent electrical shorting when coming into contact with other devices.

The system frame member can be fitted with a roller in contact with the shape memory alloy actuator wire and positioned between both ends of the shape memory alloy actuator wire. The roller acts as a guide for the shape memory alloy actuator wire to ensure the direction of movement of the wire.

Both ends of the shape memory alloy actuator wire can include connecting means for attaching the shape memory alloy actuator wire to the pivoting device and the frame member or strain relief device.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENT

Figure 1:
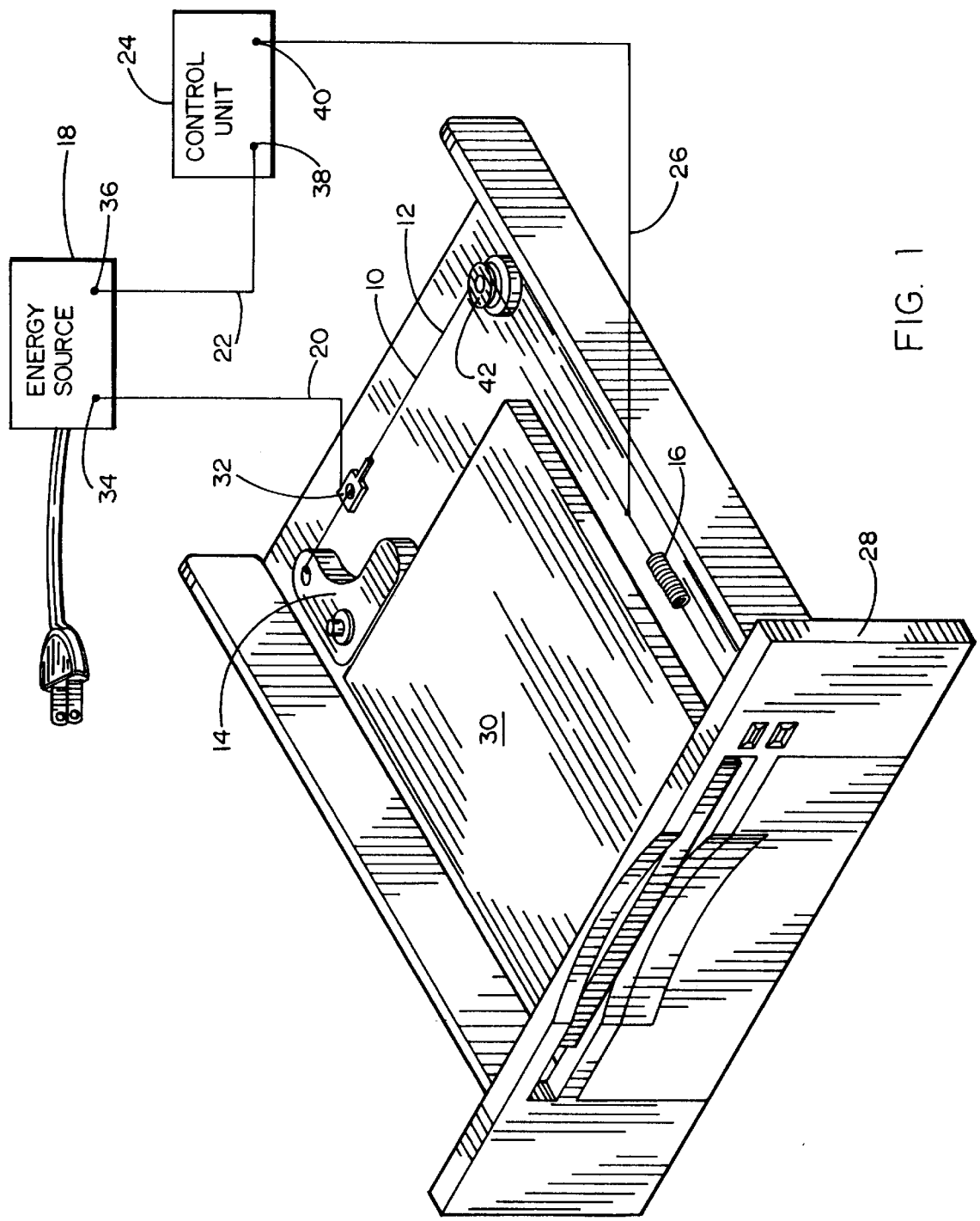
FIG. 1 is cross-sectional side view of a module according to the present invention.
Figure 2:
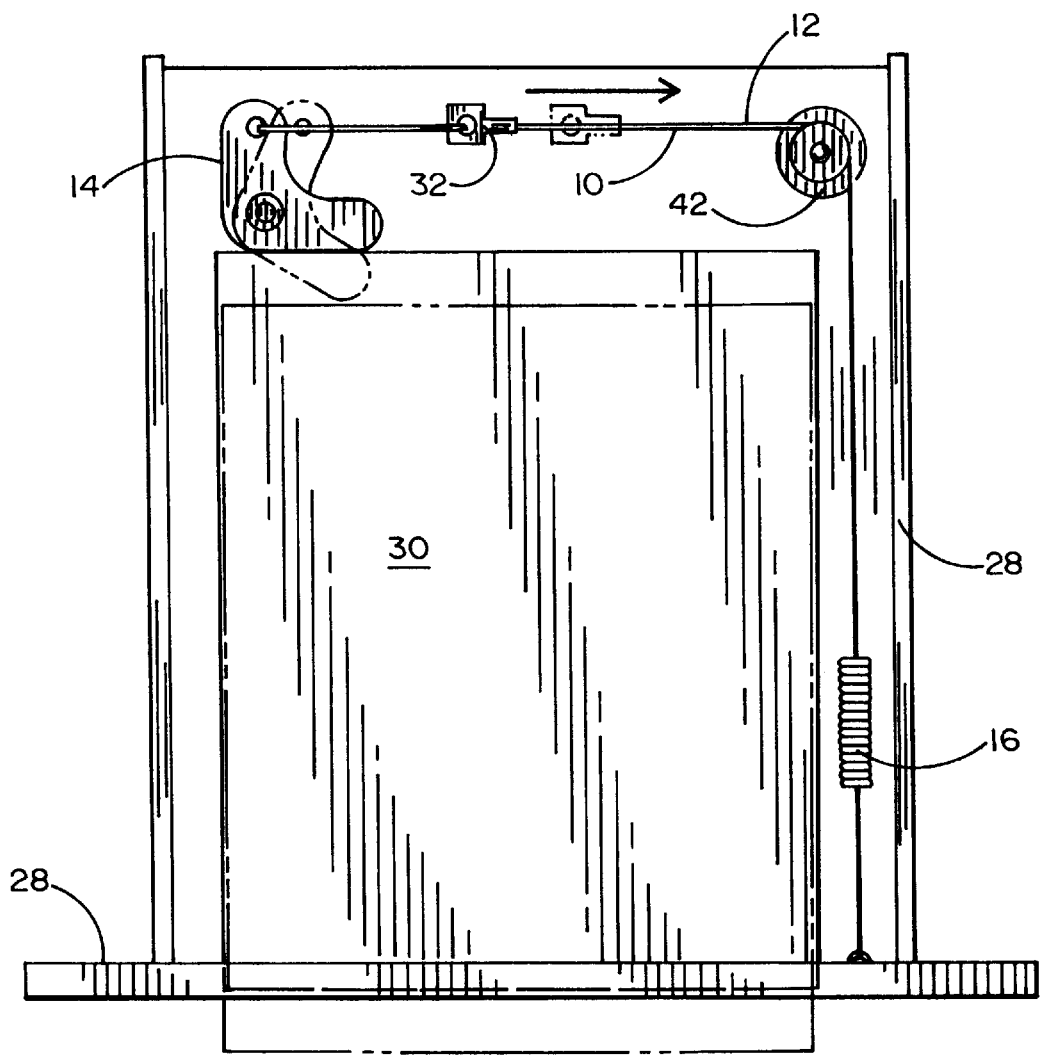
FIG. 2 is a top view of a module according to the present invention.

The present invention is directed to a mechanism for ejecting a docketed device that is particularly suitable for computer applications, video applications, audio applications, and other similar electronic applications. With reference to FIGS. 1–2 of the drawings, a shape memory alloy actuator wire 10 having a wire insulator 12 and having two ends. One end being connected to a wire connector 32. The other end being connected to a strain relief 16 for relieving high stresses to the shape memory alloy actuator wire 10. The wire connector 32 being attached to a pivoting device 14. The pivoting device 14 is strategically positioned within the system frame member 28 at a distance relative to that of the length of a docketed device 30.

A device suitable for use as the shape memory alloy actuator wire is available as Flexinol™ Actuator Wires from Dynalloy, Inc. of Irvine, Calif. The composition of the Flexinol™ Actuator Wires is made of nickel-titanium. The Flexinol™ Actuator Wires has the ability to flex or shorten like a muscle when electrically driven. In the configuration of FIGS. 1–2, there is a total of 1 shape memory alloy actuator wire 10 employed. However, a plurality of the shape memory alloy actuator wire 10 can be employed and this description is not intended to limit the scope of the invention.

A docketed device 30 being seated within the system frame member 28 and is in contact with the pivoting device 14.

An energy source 18 having at least two terminals, terminal no. 1 34 and terminal no. 2 36.

A control unit 24 includes a control unit input terminal 38 and a control unit output terminal 40.

Terminal no. 1 34 of the energy source 18 being connected to one end of the shape memory alloy actuator wire 10 via a first energy source conductor 20. Terminal no. 2 36 being connected to a control unit input terminal 38 via a second energy source conductor 22. The control unit output terminal 40 being connected to the end of the shape memory alloy actuator wire 10 opposite to that of the first energy source conductor 20 is connected to via a conductor 26.

The control unit 24 controls the flow of current to the shape memory alloy actuator wire 10. Upon activation of the control unit 24, electrical current flows from the energy source 18 into the shape memory alloy actuator wire 10 via the first energy source conductor 20 and the conductor 26, the shape memory alloy actuator wire 10 shortens and creates a pulling force exerted on the pivoting device 14. Through the usage of a wire roller guide 42, the shape memory alloy actuator wire 10 pulls the pivoting device 14 and acting similarly to that of a cam, the pivoting device 14 pushes the docketed device 30 out of the system frame member 28.

Although the present invention has been described in considerable detail with reference to certain preferred versions thereof, other versions are possible. For example, multiple wire roller guides 42 can be used to further cooperate with the shape memory alloy actuator wire 10 and be custom fitted within the internal architecture of the system frame member 28. Also, the control unit 24 can be replaced with a simple switch for a simpler operation. Of course, a plurality of shape memory alloy actuator wires 10 can be employed for increasing actuating force and for increasing reliability of the system.

Therefore, the spirit and scope of the appended claims should not necessarily be limited to the description of the preferred versions contained herein.

What is claimed is:

1. A peripheral docking module comprising:
   (a) a system frame member having a docketed device seated therein;
   (b) at least one pivoting device mounted within the system frame member positioned abutting said docketed device;
   (c) at least one shape memory alloy actuator wire having two ends, one end is attached to the pivoting device, the other end is attached to the frame member;
   (d) an energy source having two terminals, a terminal no. 1 and a terminal no. 2, a first energy source conductor connected between one end of the shape memory alloy actuator wire and terminal no. 1; and
   (e) a control unit having a control unit input terminal and a control unit output terminal, a second energy source conductor is connected between terminal no. 2 and control unit input terminal, a conductor is connected between control unit output terminal and the end of the shape memory alloy actuator wire, opposite to that of which terminal no. 1 is attached to,
   whereby upon application of energy from the energy source to the shape memory alloy actuator wire, said shape memory alloy actuator wire contracts and exerts pulling force on the pivoting device and ejects the docketed device.

2. The peripheral docking module of claim 1, wherein the shape memory alloy actuator wire is made of nickel-titanium elements.

3. The peripheral docking module of claim 1, wherein a wire connector is connected between the pivoting device and the shape memory alloy actuator wire.

4. The peripheral docking module of claim 1, wherein the energy source is an electrical source.

5. The peripheral docking module of claim 1, wherein a strain relief device is connected between the shape memory alloy actuator wire and the system frame member.

6. The peripheral docking module of claim 1, wherein a spring device is connected between the shape memory alloy actuator and the system frame member.

7. The peripheral docking module of claim 1, wherein the control unit is comprised of a switch.

8. A peripheral docking module comprising:
   (a) a system frame member having a docketed device seated therein;
   (b) at least one pivoting device mounted within the system frame member;
   (c) at least one wire roller guided mounted on the system frame member;
   (d) at least one shape memory alloy actuator wire having two ends, one end is attached to a wire connector, the other end of the shape memory alloy actuator wire is attached to the frame member, the wire roller guide positioned between the two ends of the shape memory alloy actuator wire, the shape memory alloy actuator wire being engaged to the wire roller guide and being ably freely sliding about said wire roller guide;
   (e) the wire connector is designed to have a second connection, the second connection being connected to the pivoting device;
   (f) an energy source having two terminals, a terminal no. 1 and a terminal no. 2, a first energy source conductor connected between one end of the shape memory alloy actuator wire and terminal no. 1; and
   (g) a control unit having a control unit input terminal and a control unit output terminal, a second energy source conductor is connected between terminal no. 2 and control unit input terminal, a conductor is connected between control unit output terminal and the end of the shape memory alloy actuator wire, opposite to that of which terminal no. 1 is attached to, whereby upon application of energy from the energy source to the shape memory alloy actuator wire, said shape memory alloy actuator wire contracts and exerts pulling force on the pivoting device and ejects the docketed device.

9. The peripheral docking module of claim 8, wherein the shape memory alloy actuator wire is insulated with a wire insulator.

10. The peripheral docking module of claim 8, wherein the shape memory alloy actuator wire is made of nickel-titanium elements.

11. The peripheral docking module of claim 8, wherein a wire connector is connected between the pivoting device and the shape memory alloy actuator wire.

12. The peripheral docking module of claim 8, wherein the energy source is an electrical source.

13. The peripheral docking module of claim 8, wherein a strain relief device is connected between the shape memory alloy actuator wire and the system frame member.

14. The peripheral docking module of claim 8, wherein a spring device is connected between the shape memory alloy actuator and the system frame member.

15. The peripheral docking module of claim 8, wherein the control unit is comprised of a switch.

16. A peripheral docking module comprising:

(a) a system frame member having a docketed device seated therein;

(b) at least one pivoting device mounted within the system frame member;

(c) at least one wire roller guide mounted on the system frame member;

(d) at least one shape memory alloy actuator wire having two ends, one end is attached to a wire connector, the other end of the shape memory alloy actuator wire is attached to the frame member, the shape memory alloy actuator wire is insulated with a wire insulator, the wire roller guide positioned between the two ends of the shape memory alloy actuator wire, the shape memory alloy actuator wire being engaged to the wire roller guide and being ably freely sliding about said wire roller guide;

(e) the wire connector is designed to have a second connection, the second connection being connected to the pivoting device;

(f) an energy source having two terminals, a terminal no. 1 and a terminal no. 2, a first energy source conductor connected between one end of the shape memory alloy actuator wire and terminal no. 1; and (g) a control unit having a control unit input terminal and a control unit output terminal, a second energy source conductor is connected between terminal no. 2 and control unit input terminal, a conductor is connected between control unit output terminal and the end of the shape memory alloy actuator wire, opposite to that of which terminal no. 1 is attached to, whereby upon application of energy from the energy source to the shape memory alloy actuator wire, said shape memory alloy actuator wire contracts and exerts pulling force on the pivoting device and ejects the docketed device.

17. The peripheral docking module of claim 16, wherein a strain relief device is connected between the shape memory alloy actuator wire and the system frame member.

18. The peripheral docking module of claim 16, wherein the control unit is comprised of a switch.

19. The peripheral docking module of claim 16, wherein the shape memory alloy actuator wire is made of nickel-titanium elements.

20. The peripheral docking module of claim 16, wherein the energy source is an electrical source.

* * * * *